United States Patent
Bryce et al.

(10) Patent No.: US 10,081,442 B2
(45) Date of Patent: Sep. 25, 2018

(54) MULTIPLE DECK CARGO CONTAINER

(71) Applicant: DEUTSCHE POST AG, Bonn (DE)

(72) Inventors: Martin Bryce, Buckinghamshire (GB); Paul Richardson, Buckinghamshire (GB); Kyle Robertson, Buckinghamshire (GB); Mark Defanis, Buckinghamshire (GB)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 14/901,612

(22) PCT Filed: Jun. 27, 2014

(86) PCT No.: PCT/GB2014/051967
§ 371 (c)(1),
(2) Date: Dec. 28, 2015

(87) PCT Pub. No.: WO2015/001318
PCT Pub. Date: Jan. 8, 2015

(65) Prior Publication Data
US 2016/0368622 A1     Dec. 22, 2016

(30) Foreign Application Priority Data
Jul. 1, 2013   (GB) .................................. 1311763.5

(51) Int. Cl.
*B64F 1/32*     (2006.01)
*B60P 1/02*     (2006.01)
(Continued)

(52) U.S. Cl.
CPC .................. *B64F 1/32* (2013.01); *B60P 1/02* (2013.01); *B60P 3/00* (2013.01); *B66F 11/042* (2013.01); *Y02T 50/82* (2013.01)

(58) Field of Classification Search
CPC ........... B60P 1/02; B60P 3/205; B66F 11/042; B64F 1/32
(Continued)

(56) References Cited

U.S. PATENT DOCUMENTS 5,848,870 A * 12/1998 Smith ....................... B60P 1/02
                                                     296/26.05
7,014,238 B2 *  3/2006 Gonzalez ................. B60P 1/02
                                                     296/26.05
(Continued)

FOREIGN PATENT DOCUMENTS

CL        200902089         2/2010
CL        201001183         2/2011
(Continued)

OTHER PUBLICATIONS

Office Action dated Feb. 12, 2018 in corresponding Chilean Patent Application No. 201503705.

*Primary Examiner* — James Keenan
(74) *Attorney, Agent, or Firm* — Nath, Goldberg & Meyer; Jerald L. Meyer; Stanley N. Protigal (57) ABSTRACT

The invention provides a multiple decked cargo container, suitable for use inter alia in aircraft catering operations. The container comprises a floating deck and vertically moveable roof, to allow for an increased load carrying capacity via two vertically stacked storage areas, whilst meeting height restrictions and providing sufficient headroom for ground crew to access the interior of the container.

9 Claims, 8 Drawing Sheets

CATERING AIRCRAFT FROM TOP LEVEL (51) Int. Cl.
*B60P 3/00* (2006.01)
*B66F 11/04* (2006.01)

(58) Field of Classification Search
USPC .................................... 296/26.05; 414/347
See application file for complete search history.

(56) References Cited

U.S. PATENT DOCUMENTS 8,376,437 B2 * 2/2013 Edens .................... B60J 7/1614
296/100.05
8,844,206 B2 * 9/2014 Johnstone ............. B66F 11/042
52/143

FOREIGN PATENT DOCUMENTS

| | | | | |
|---|---|---|---|---|
| DE | 102004043164 A1 * | 3/2006 | ................ | B60P 1/02 |
| DE | 202009009485 U1 | 2/2010 | | |
| DE | 102009032565 A1 | 1/2011 | | |
| DE | 102011078222 A1 | 1/2013 | | |
| EP | 1193174 A2 | 4/2002 | | |
| EP | 1607366 A1 | 12/2005 | | |
| GB | 2523849 A * | 9/2015 | ................ | B64F 1/32 |
| JP | 2004189005 A | 7/2004 | | |
| WO | 80/01553 A1 | 8/1980 | | |
| WO | 8001553 A1 | 8/1980 | | |

\* cited by examiner

AT LOADING DOCK FILLING/EMPTYING BOTTOM LEVEL

MULTIPLE DECK CARGO CONTAINER

This is a National Phase Application filed under 35 U.S.C. 371 as a national stage of PCT/GB2014/051967, filed Jun. 27, 2014, an application claiming the benefit of United Kingdom Application No. 1311763.5, filed Jul. 1, 2013, the content of each of which is hereby incorporated by reference in its entirety.

The invention provides a multiple decked cargo container, suitable for use inter alia in aircraft catering operations. The container comprises a floating deck and vertically moveable roof, to allow for an increased load carrying capacity via two vertically stacked storage areas, whilst meeting height restrictions and providing sufficient headroom for ground crew to access the interior of the container. The invention also provides vehicles comprising such containers, methods of loading and unloading such containers and methods of loading and unloading aircraft utilising such containers.

BACKGROUND

In the air freight industry, loaders are used to load cargo onto an aircraft and also to unload cargo from the aircraft. Such loaders are generally self-propelled vehicles with a load bed that is either capable of elevation from ground level to a position adjacent to the cargo bay door of an aircraft, or have a conveyor belt or other suitable lifting means for raising the cargo to the height of the cargo bay.

A particular type of loader is an aircraft catering vehicle. Aircraft catering vehicles are designed to allow rapid transfer of catering trolleys and other supplies to and from aircraft as part of the preparation of aircraft for flight (turnround). They typically consist of a van body mounted on a standard vehicle (e.g. truck) chassis. The van body is raised up to the aircraft door by a scissor lift mechanism. Access to and from the aircraft door is via a platform, which is often fitted with an extending section (bridge or bridge plate).

Current aircraft catering vehicles suffer from a number of drawbacks. For example, the much larger size of aircraft in use today means that they carry a far larger number of passengers, meaning that a greater number of catering trolleys must be loaded and unloaded at every turnround. This either necessitates servicing of one aircraft with multiple aircraft catering vehicles, which is inefficient in terms of capital costs and fuel consumption, or multiple loading and unloading visits by a single aircraft catering vehicle, which is also inefficient in terms of fuel consumption and causes undesirable delay. For these reasons, an aircraft catering vehicle having a higher load capacity in terms of the number of catering trolleys is desirable.

However, the physical size of aircraft catering vehicles is constrained by a number of factors.

In principle, it is possible to increase the width of the body of the vehicle. However, because of the need for aircraft catering vehicles to travel on public highways, they must comply with local legislation which limits the width of goods vehicles to below 2.55 meters in most European countries. Additionally, the majority of airports have width restrictions which apply to vehicles travelling airside. Finally, a wider bodied vehicle would require specialist bespoke chassis to be manufactured at significant cost making the vehicle un-economic.

Increasing the length of the vehicle is also an option. Existing vehicles are circa 9 meters in length. There is significant scope for building longer trucks, potentially up to 18.45 m in length. However, airports generally require that vehicles have a turning circle of less than 33 feet (10 meters). This would require any vehicle much larger than 9 meters to be articulated with rear steering axles. Articulated vehicles are not permitted to engage with aircraft doors to load/unload them as there is deemed to be a risk of damaging the aircraft.

The final option would be to increase the height of the vehicle. Although there is no specific height requirement dictated about vehicles operating on an airfield, from a practical view point, the presence of bridges and other obstacles dictates an overall height of 4 meters or less in order to allow the vehicle to move around the airport uninhibited. Additionally, for the vehicle to have applications outside of the UK, typically regulations in other jurisdictions mandate that vehicles must not exceed 4 meters in height. A further problem with high vehicles is that the centre of gravity becomes elevated, meaning that the stability of the vehicle is reduced.

An additional constraint imposed on aircraft catering vehicles is that there be a suitable working height for operatives to enter the loading area to load and unload catering trolleys.

The present invention seeks to address these and other problems of the prior art.

SUMMARY OF THE INVENTION

According to a first embodiment, the invention provides a cargo container comprising:

a generally horizontal floor capable of supporting cargo, a generally horizontal movable roof, a generally horizontal floating platform capable of supporting cargo disposed between the base and the roof, side walls, end walls and at least one entrance for allowing loading and unloading of cargo, wherein the roof is vertically movable relative to the floor so as to vary the height cargo container and the floating base is independently vertically movable relative to the floor.

In a second embodiment, the invention provides a mobile vehicle comprising a cargo container according to the first embodiment.

In a third embodiment, the invention provides a method of loading and unloading a cargo container according to the first embodiment.

In a fourth embodiment, the invention provides a method of loading and unloading an aircraft utilising a mobile vehicle according to the second embodiment.

DETAILED DESCRIPTION

The present invention allows for an increased cargo capacity compared with known aircraft catering vehicles. The vertically moveable roof and floating deck allow for two loads of catering trolleys (or other cargo) to be stored and transported, stacked one over the other.

The cargo container comprises a generally horizontal floor capable of supporting cargo, a generally horizontal movable roof, a generally horizontal floating platform capable of supporting cargo disposed between the base and the roof, sidewalls and at least one entrance for allowing loading and unloading of cargo, wherein the roof is vertically movable relative to the floor so as to vary the height cargo container and the floating base is independently vertically movable relative to the floor.

The cargo container is provided with side walls which define the left and right sides of the container, which is preferably of generally rectangular parallelepiped form, conventional with cargo containers. In a preferred embodiment, the side walls are comprised of two sections. The floor is provided with two first side walls, and the floor and first side walls together are generally U-shaped in cross-section. Roof is also provided with two second side walls, and roof and second side walls together are generally inverted U-shaped in cross-section. The floor and first side walls (18) slidably engage within roof and second side walls. Roof and second side walls form a canopy over the floor, first side walls, and the interior of the container together with any cargo. The first and second side walls are dimensioned such that they always form a continuous side wall irrespective of the degree of elevation of the roof.

The cargo container is provided with at least one entrance for allowing loading and unloading of cargo. The entrance may be at any suitable point on the container, but preferably is incorporated into one of the end walls. The entrance is preferably closable, and can be of any type known in the art, preferably a door, pair of doors, roller shutter or folding gate. A roller shutter is preferred.

In a preferred embodiment, the cargo container is provided with two entrances for allowing loading and unloading of cargo. Preferably, each end wall is provided with such an entrance. More preferably, one entrance is adapted for loading and unloading cargo at a loading dock, and the other entrance is adapted for loading and unloading cargo at an aircraft.

In a preferred embodiment, the cargo container is provided with a loading gantry external to the container. The loading gantry is affixed to the end wall of the cargo container which comprises an entrance. The loading gantry is of a conventional type known in the field of cargo loading containers, having a loading platform and safety rails, and is adapted to engage with a cargo door in the fuselage of an aircraft, such that cargo can be transferred between the hold of the aircraft and the interior of the cargo container.

Preferably, the loading gantry is vertically moveable with respect to the end wall, such that the loading platform is capable of forming a continuous, substantially level surface together with either the floor or the floating platform, depending on which cargo storage area is being used to cater the aircraft. The loading gantry is suitably moved via an electric motor or pneumatic or hydraulic lifts.

It may be convenient or desirable to provide the cargo container with a refrigerator, such as when food or other perishable items are being transported.

It may be convenient or desirable to provide access means to allow ground crew to enter the cargo container. A ladder is a preferred access means. The ladder suitably connects with a hatch, optionally closable, provided in the floor of the cargo container.

It may be convenient or desirable to provide access means to allow ground crew to move between the first and second cargo storage areas. An interconnecting ladder is a preferred access means. The interconnecting ladder suitably connects with an interconnecting hatch, optionally closable, provided in the floating deck of the cargo container. In a preferred embodiment, the interconnecting ladder is stowable to allow the floating deck to fully descend to abut the floor. This is suitably achieved by having the interconnecting ladder pivotally attached to the floating deck at one side of the interconnecting hatch.

In a first configuration, the roof is fully lowered and the floating deck positioned approximately midway between the roof and the floor. The overall height of the cargo container is at a minimum, and suitable for moving the container around the airport or on a public highway. In this configuration, the roof preferably closely abuts the cargo in the second cargo storage area. Likewise, the floating deck preferably closely abuts the cargo in the first cargo storage area.

In a preferred embodiment, the cargo container is adapted for the storage and loading/unloading of airline catering trolleys. Such trolleys, used for the storage and refrigeration of meals prepared on the ground, are of a standard size and are invariably mounted on coasters to allow for their manoeuvring onto, off of and around the aircraft. The overall height of such catering trolleys is 1030 mm; thus, cargo containers of the invention adapted for the transportation of catering trolleys have a typical floor to floating deck height of at least 1030 mm when in the first (collapsed) configuration. Preferably, the floor to floating deck height is between 1050 and 1200 mm. Likewise, in this configuration, the floating deck to roof height is at least 1030 mm. Preferably, the floor to floating deck height is between 1050 and 1200 mm.

In an alternative embodiment, the cargo container can be adapted to receive other types of air freight, such as unit load devices (ULDs). In this case, the standard height of the cargo is 1630 mm, which would dictate a floor to floating deck height of at least 1630 mm, such as between 1650 and 2000 mm. Likewise, in this embodiment, the floating deck to roof height is at least 1630 mm in the first configuration. Preferably, the floor to floating deck height is between 1650 and 2000 mm.

In a second configuration, the roof is fully lowered, and the floating deck is also fully lowered such that it abuts or substantially abuts the floor. This allows for cargo (e.g. catering trolleys) to be loaded and unloaded via a loading dock or other suitable structure.

In a third configuration, the floating deck is raised relative to the floor. This serves to increase the available headroom in the first cargo storage area and allows for personnel to access the storage area and load/unload the cargo.

In a fourth configuration, the roof is raised relative to the floor and the floating deck. This serves to increase the available headroom in the second cargo storage area and permits personnel to access the storage area and load/unload the cargo. This allows personnel to safely and conveniently access the contents of the second cargo storage area. In this configuration, the roof is preferably at least 1.8 meters above the floating deck, taking into account the average height of a human being. Likewise, in the third configuration, the floating deck is preferably at least 1.8 meters above the floor.

Various means are known in the art to move the roof and floating deck in a vertical direction. Examples of such means are pneumatic cylinders, hydraulic cylinders or mechanical hoists.

In a further embodiment, the invention provides a mobile vehicle comprising a cargo container according to the first embodiment. Such a vehicle can be self-propelled, or can be otherwise moveable, such as by towing. Preferably, the cargo container is mounted on the bed of a conventional ground service vehicle, such as a truck.

Preferably, the cargo container is mounted on a lift provided on the bed of the mobile vehicle such that the entire cargo container can be raised or lowered. Various means are known in the art for the raising and lowering of cargo containers, including hydraulic and pneumatic lifts, mechanical lifts. A preferred means is a scissor lift. A scissor lift makes use of linked, folding supports in a criss-cross "X" pattern, known as a pantograph (or scissor mechanism). The upward motion is achieved by the application of pressure to the outside of the lowest set of supports, elongating the crossing pattern, and propelling the cargo container vertically.

The various moving elements of the cargo container and vehicle are preferably controlled electronically. The controls are suitably situated in the cab of the vehicle.

With reference to the Figures—

Figure 1:
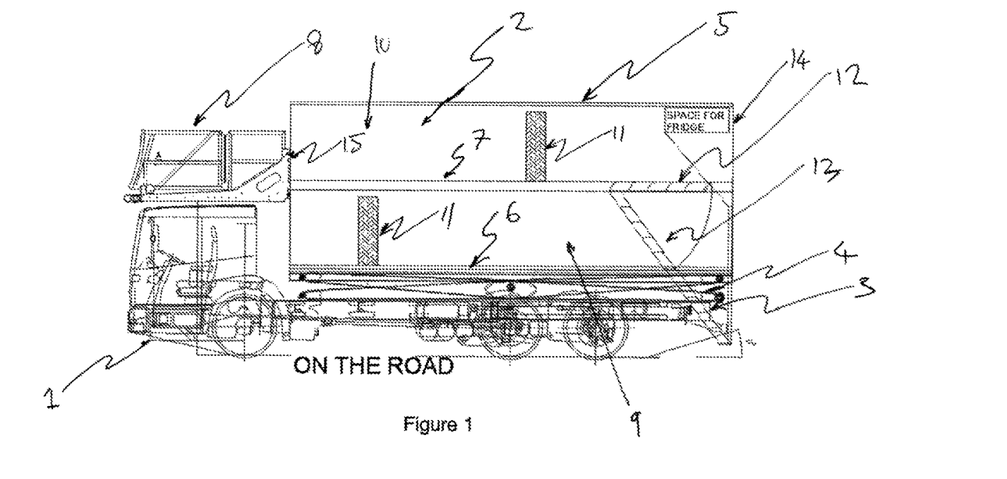
FIG. 1 is a sectional view of truck comprising a cargo container according to an embodiment of the invention, showing the cargo container configured for road transit.

A mobile vehicle comprising a cargo container according to the invention is shown in section in FIG. 1. A standard truck chassis (1) having a cab, three axles and a truck bed (3) supports a cargo container (2) mounted on truck bed (3) via a scissor lift (4). Cargo container (2) comprises a generally horizontal movable roof (5) defining the top of the container (2), generally horizontal base (6) defining the bottom of the container, and floating platform (7) disposed between and substantially parallel to the roof (5) and base (6). The cargo container is provided with a loading gantry (8) suitable for engaging with the cargo hatch of an aircraft, and via which cargo may be loaded and unloaded onto an aircraft. The loading gantry (8) is vertically moveable relative to the body of the cargo container, and communicates with first (9) and second (10) cargo storage areas by way of a roller shutter which forms front wall (15). Base (6) and the floating platform (7) define a first cargo storage area (9), and floating platform (7) and roof (5) define a second cargo storage area (10). The first (9) and second (10) cargo storage areas carry a plurality of catering trolleys (11); only one representative trolley is shown for the sake of clarity. The first (9) and second (10) cargo storage areas are connected by an access hatch (12). Access ladder (13), has a collapsible upper section and a lower section extending outside of the container to allow entry of personnel. Rear wall (14) is formed by a roller shutter which permits access to the first (9) and second (10) cargo storage areas.

The mobile vehicle comprising a cargo container according to the invention shown in FIG. 1 is configured for conveying a load of catering trolleys by road, for example between a loading dock and an aircraft. Roof (5) is fully lowered, floating deck (7) sits approximately mid-way between roof (5) and floor (6). The height of the first (9) and second (10) cargo storage areas is just sufficient to provide clearance for catering trolleys (11). Rear (14) and front (15) roller shutters are closed. Scissor lift (4) is fully lowered such that the cargo container sits close to truck bed (3). Gantry (8) is positioned towards the top of the container to allow clearance for the cab of the truck.

Figure 7:
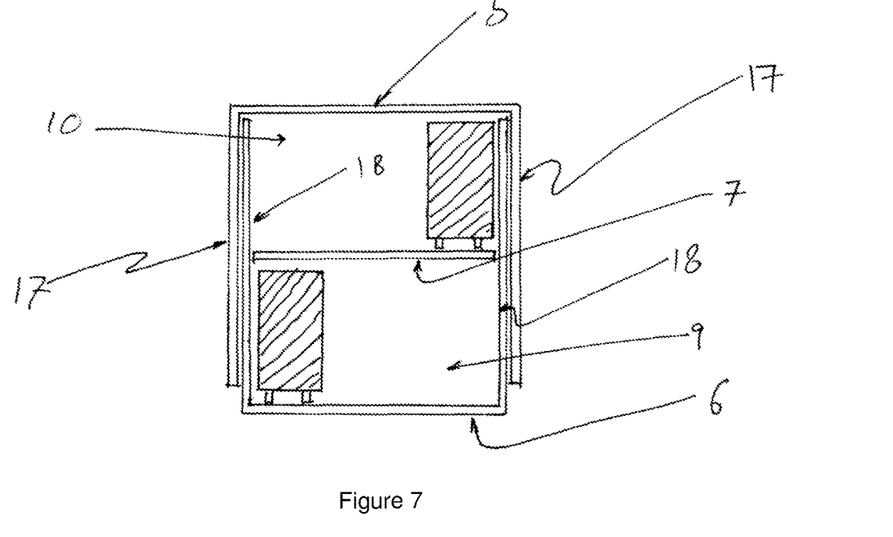
FIG. 7 is an alternative sectional view of truck comprising a cargo container according to an embodiment of the invention, showing the cargo container configured for road transit.

The cargo container of FIG. 1 is shown in alternative section in FIG. 7. Floor (6) is provided with two first side walls (18), and the floor (6) and first side walls (18) together are generally U-shaped in cross-section. Roof (5) is provided with two second side walls (17), and roof (5) and second side walls (17) together are generally inverted U-shaped in cross-section. The floor (6) and first side walls (18) slidably engage within roof (5) and second side walls (17). Roof (5) and second side walls (17) form a canopy over the floor (6), first side walls (18), first (9) and second (10) cargo storage areas, together with the catering trolleys. With roof (5) fully lowered, first side walls (18) and second side walls (17) substantially overlap.

Figure 2:
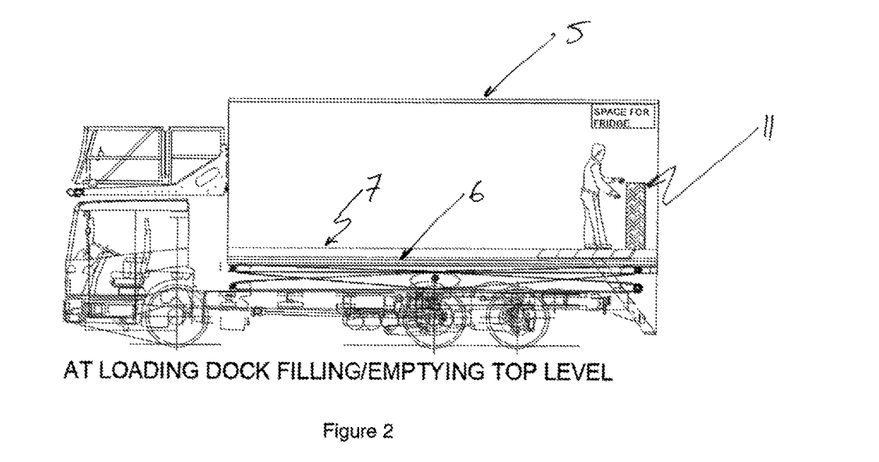
FIG. 2 is a sectional view of truck comprising a cargo container according to an embodiment of the invention in a configuration allowing for loading/unloading of the second cargo storage area.
Figure 8:
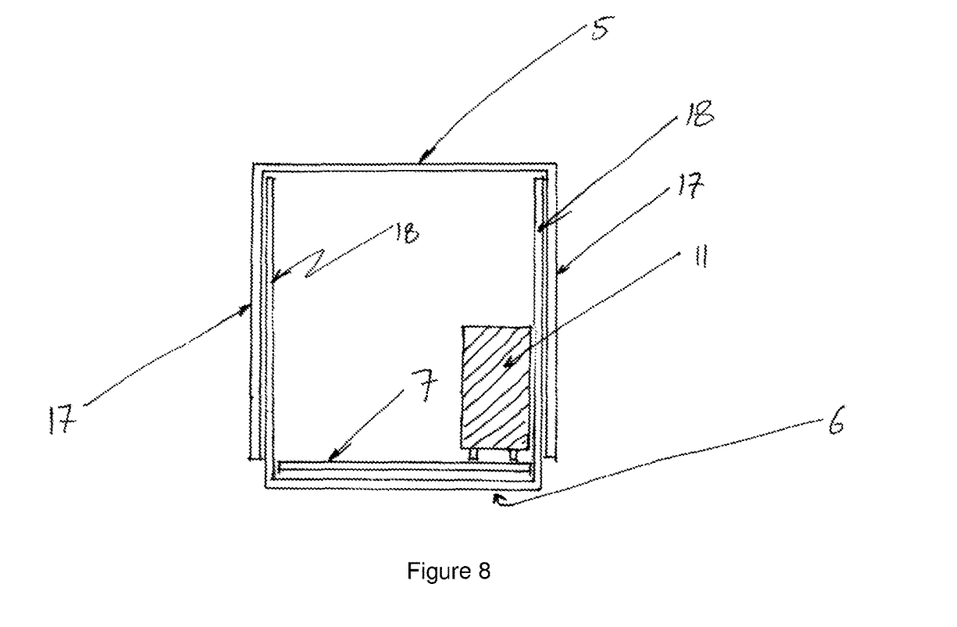
FIG. 8 is an alternative sectional view of truck comprising a cargo container according to an embodiment of the invention in a configuration allowing for loading/unloading of the second cargo storage area.

FIG. 2 shows a mobile vehicle comprising a cargo container configured for loading the second cargo storage area (10) at a loading dock. The scissor lift (4) is in the fully lowered position. Floating deck (7) is fully lowered and abuts floor (6). The roof (5) is fully lowered, that is in the same position as shown in FIG. 1. The lowered position of the floating deck (7) increases the height of the second cargo storage area (10) sufficient to provide a convenient working space for ground crew to load and unload catering trolleys (11) via the rear roller shutter (14), which is open to allow access between the second storage area (10) and the loading dock (not shown). The floating deck (7) is positioned at a height above the ground such that it is substantially level with the loading dock, allowing for catering trolleys (11) to be wheeled on and off. The upper section of access ladder (13), is pivoted and lies horizontal, substantially parallel and contained within access hatch (12). In this configuration, the cargo container is shown in alternative section in FIG. 8.

Figure 3:
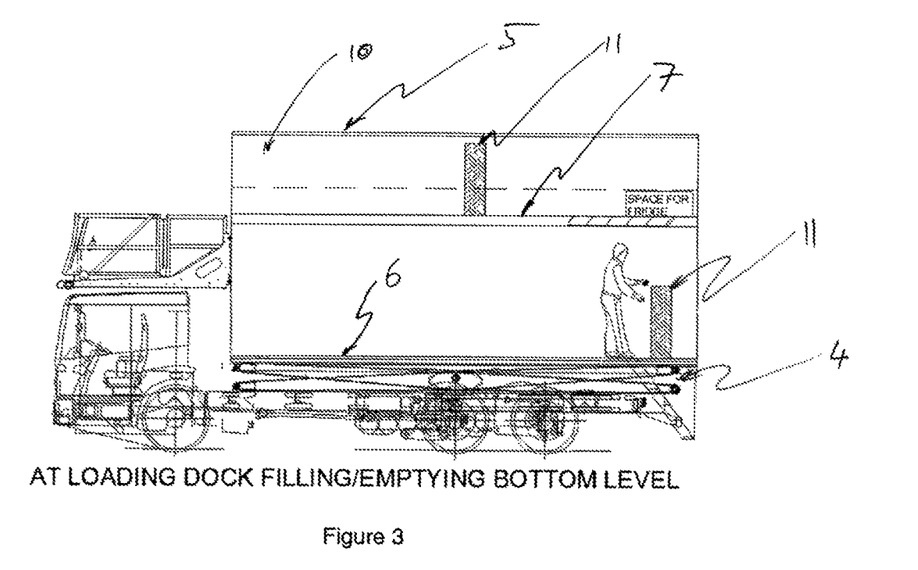
FIG. 3 is a sectional view of truck comprising a cargo container according to an embodiment of the invention in a configuration allowing for loading/unloading of the first cargo storage area.

FIG. 3 shows a mobile vehicle comprising a cargo container configured for loading the first cargo storage area (9) at a loading dock. Scissor lift (4) is in the fully lowered position. The roof (5) is vertically raised to the maximum extent relative to the floor (6). The floating deck (7) is also raised to the maximum extent relative to the floor (6). The raised height of the floating deck increases the height of the first cargo storage area (9) sufficient to provide a convenient working space for ground crew to load and unload catering trolleys (11) via the rear roller shutter (14), which is open to allow access between the first storage area (9) and the loading dock (not shown). The height of the second cargo storage area (10) is just sufficient to provide clearance for catering trolleys (11), which have previously been loaded. The floor (6) is positioned at a height above the ground such that it is substantially level with the loading dock, allowing for catering trolleys (11) to be wheeled on and off. The upper section of ladder (13) has been stowed to provide working area for the ground crew to load and unload catering trolleys.

Figure 9:
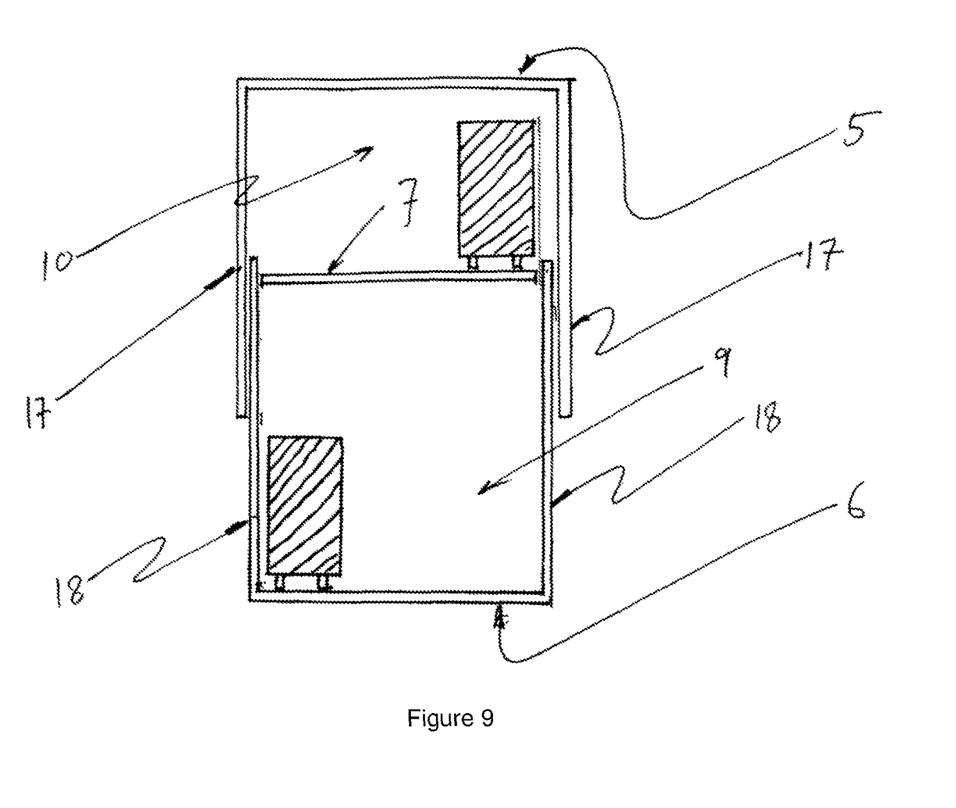
FIG. 9 is an alternative sectional view of truck comprising a cargo container according to an embodiment of the invention in a configuration allowing for loading/unloading of the first cargo storage area.
Figure 10:
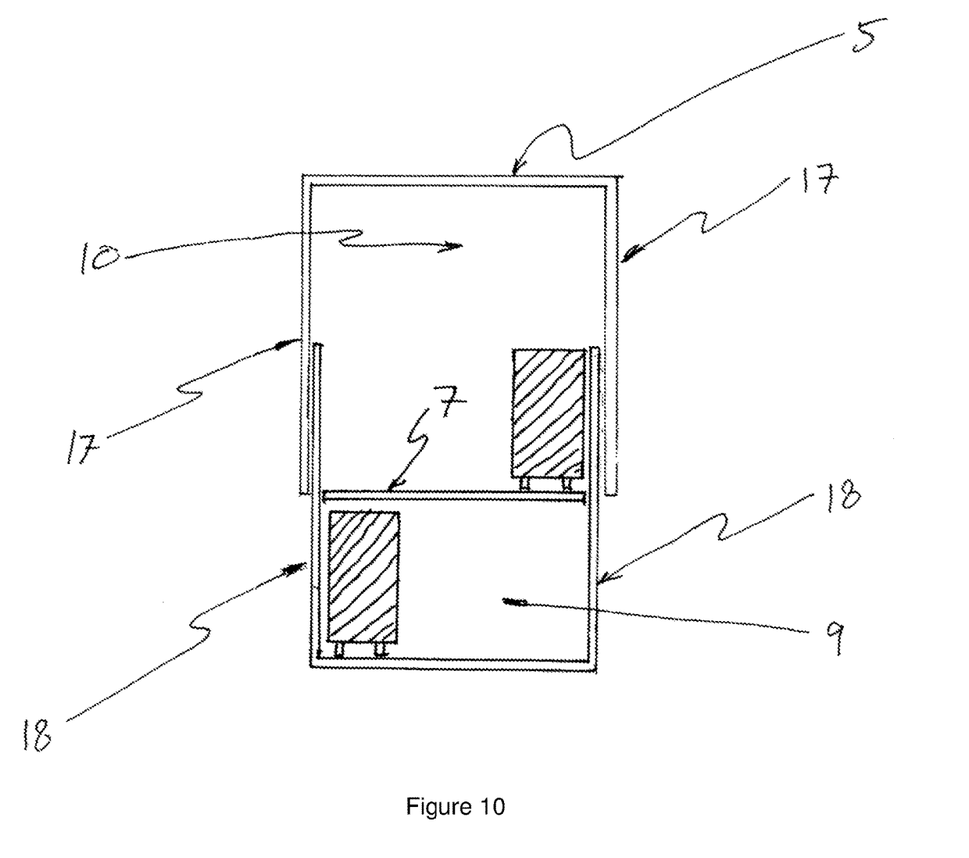
FIG. 10 is an alternative sectional view of truck comprising a cargo container according to an embodiment of the invention, showing an aircraft being catered from the first cargo storage area.

The cargo container of FIG. 3 is shown in alternative section in FIG. 9. With roof (5) fully raised relative to floor (6), first side walls (18) and second side walls (17) partially overlap to preserve an enclosed working environment within first (9) and second (10) cargo storage areas.

Figure 4:
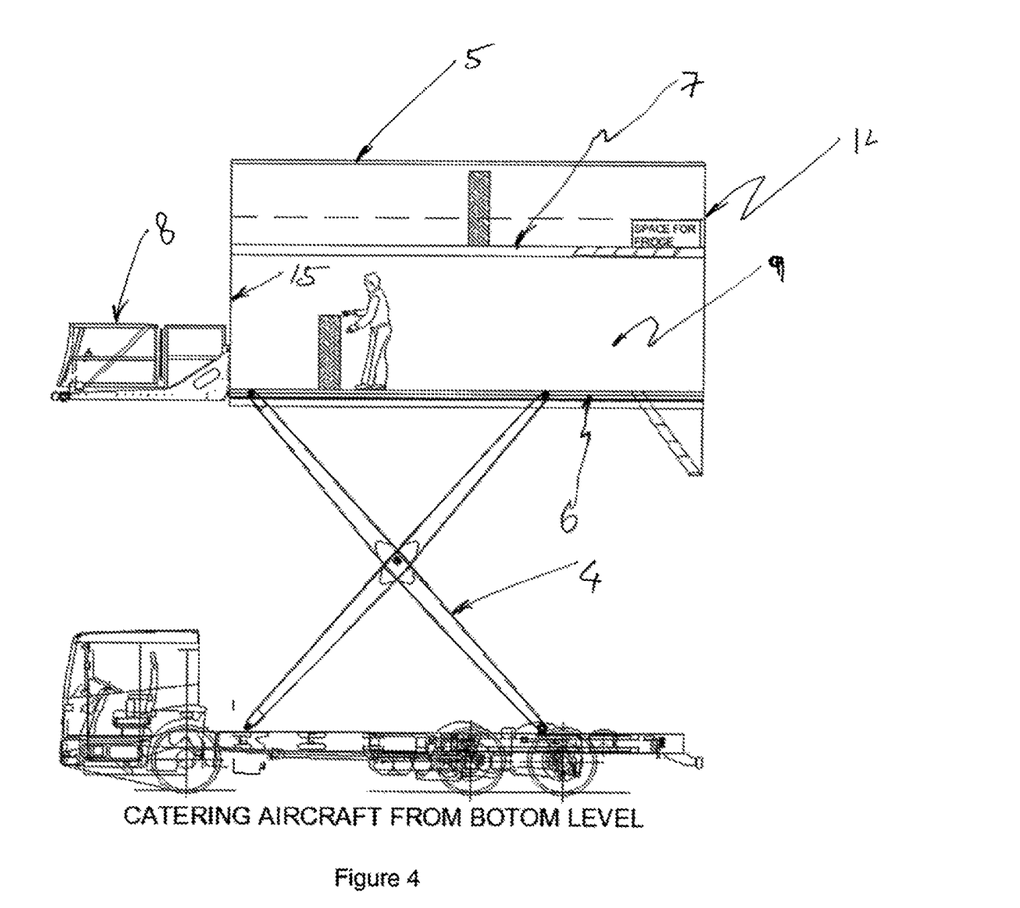
FIG. 4 is a sectional view of truck comprising a cargo container according to an embodiment of the invention, showing an aircraft being catered from the first cargo storage area.

FIG. 4 shows a mobile vehicle comprising a cargo container catering an aircraft from the first cargo storage area (9). The roof (5) is vertically raised to the maximum extent relative to the floor (6). The floating deck (7) is also raised to the maximum extent relative to the floor (6). Gantry (8) is deployed towards the bottom of the cargo container, such that the base of the gantry (8) forms a substantially continuous platform with the floor (6). Front roller shutter (15) is open to allow for catering trolleys to be loaded and unloaded. Scissor lift (4) is in a raised position, such that the gantry (8) is at an appropriate level to engage with a cargo hatch provided in the fuselage of an aircraft being catered. Rear roller shutter (14) remains closed to ensure that ground crew do not accidentally fall from the cargo container.

Figure 5:
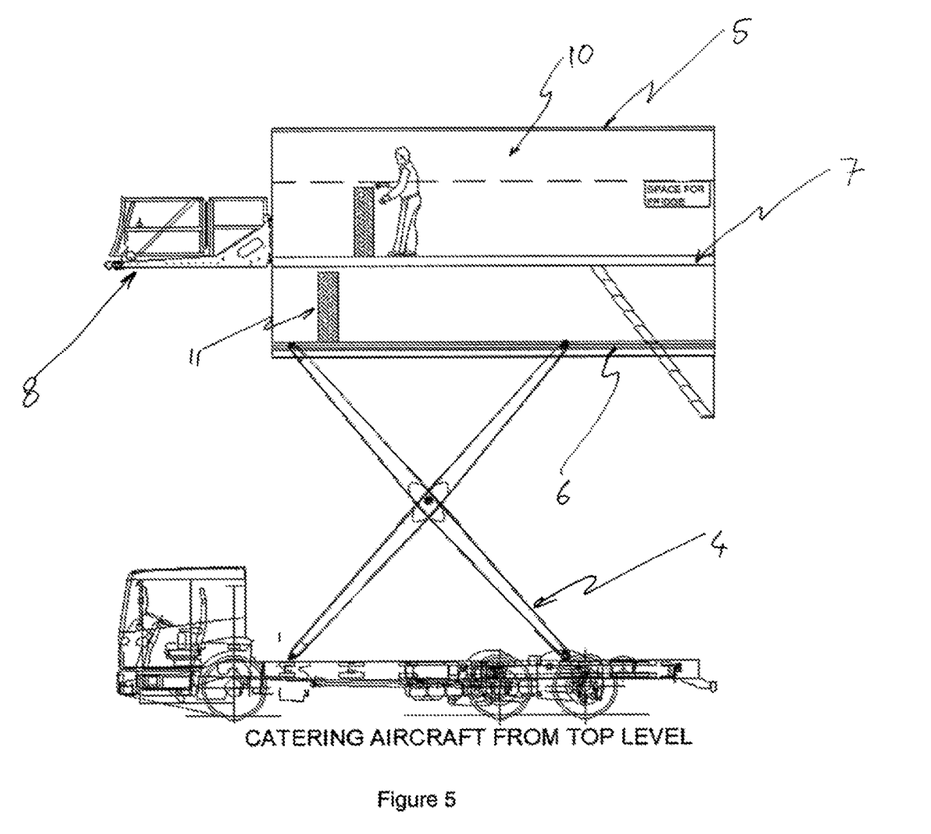
FIG. 5 is a sectional view of truck comprising a cargo container according to an embodiment of the invention, showing an aircraft being catered from the second cargo storage area.

FIG. 5 shows a mobile vehicle comprising a cargo container catering an aircraft from the second cargo storage area (10). The roof (5) is vertically raised to the maximum extent relative to the floor (6). The floating deck (7) sits in a position such that it just provides clearance above the catering trolleys in the first cargo storage area. Gantry (8) is deployed towards the middle of the cargo container, such that the base of the gantry (8) forms a substantially continuous platform with the floating deck (7). Front roller shutter (15) is open to allow for catering trolleys to be loaded and unloaded. Scissor lift (4) is in a raised position, such that the gantry (8) is at an appropriate level to engage with a cargo hatch provided in the fuselage of an aircraft being catered. Rear roller shutter (14) remains closed to ensure that ground crew do not accidentally fall from the cargo container.

Figure 6:
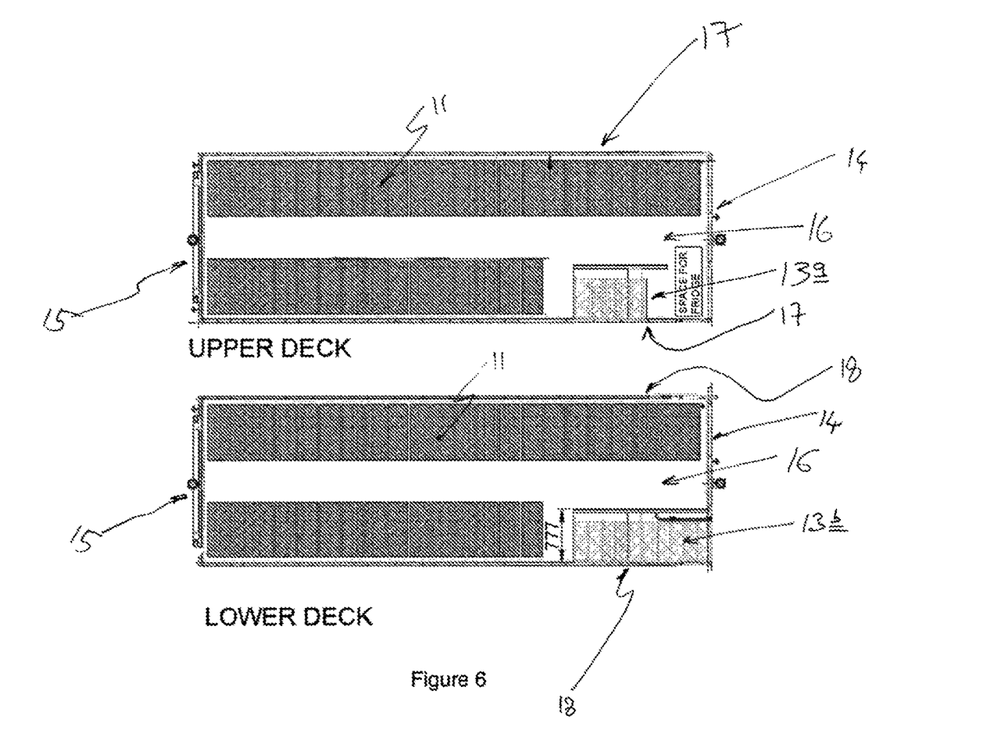
FIG. 6 is a plan view of the first and second cargo storage areas of a cargo container according to the invention.

FIG. 6 is a plan view of the first (lower) and second (upper) cargo storage areas of a cargo container, showing a full load of catering trolleys. Catering trolleys (11) are arranged in two parallel rows on each cargo storage area, with a gangway (16) in between to allow ground crew to move around the cargo container. Upper (13a) and lower (13b) sections of ladder allow ground crew to move between the cargo storage areas and the outside of the cargo container. The sides of the first (lower) cargo storage area are defined by first side walls (18). The sides of the second (upper) cargo storage area are defined by second side walls (17). Rear roller shutter (14) defines the rear of both first (lower) and second (upper) cargo storage areas. Front roller shutter (15) defines the front of both first (lower) and second (upper) cargo storage areas.

The invention claimed is:

1. A movable aircraft catering truck comprising a cargo container, the cargo container comprising:
    a generally horizontal floor capable of supporting catering trolleys arranged on the horizontal floor and providing a first catering trolley storage area,
    a generally horizontal movable roof,
    a generally horizontal floating deck capable of supporting the catering trolleys arranged on the horizontal floating deck disposed between the floor and the roof and providing a second catering trolley storage area,
    first and second side walls, end walls and at least one entrance for allowing loading and unloading of the catering trolleys,
    wherein
    the at least one entrance is provided on one of the end walls,
    the roof is vertically movable relative to the floor so as to vary the height of the cargo container,
    the floating deck is independently vertically movable relative to the floor, thereby defining a first catering trolley storage area between the floor and floating deck for carrying the catering trolleys and defining a second catering trolley storage area between the floating deck and the roof for carrying the catering trolleys,
    the first catering trolley storage area and the second catering trolley storage area each comprising a height that is sufficient for providing clearance for the catering trolleys,
    the first catering trolley storage area and the second catering trolley storage area connected by an interconnecting hatch and having provisions for a stowable interconnecting ladder,
    the floor provided with the two first side walls forming a generally U-shaped cross-section,
    the roof provided with the two second side walls forming a generally inverted U-shaped cross-section,
    the floor and the first side walls slidably engaging within the roof and the second side walls,
    the roof and the second side walls forming a canopy over the floor, the first side walls and the first and the second catering trolley storage areas when housing the catering trolleys,
    the cargo container is mounted on a body of the truck via an interposing lift, allowing the cargo container to be raised and lowered,
    a gantry having a loading platform and adapted to engage with a cargo door of an aircraft, the gantry slidably mounted on at least one of the end walls, and
    the gantry is vertically moveable with respect to the at least one end wall such that the loading platform is capable of forming a continuous, substantially level surface together with either the horizontal floor or the horizontal floating deck.

2. A movable aircraft catering truck according to claim 1, wherein
    the sidewalls of the floor is provided with two first container having a generally rectangular parallelepiped form, and wherein
    with the roof fully lowered, the first side walls and second side walls substantially overlap, and with the roof fully raised, the first and second sidewalls partially overlap to preserve an enclosed working environment withing the first and second catering trolley storage areas.

3. A movable aircraft catering truck according to claim 1, wherein the at least one entrance comprises one entrance provided on each end wall.

4. A movable aircraft catering truck according to claim 3, wherein the entrances are closable by means of a roller shutter.

5. A movable aircraft catering truck according to claim 1, wherein the interposing lift is a scissor lift.

6. A movable aircraft catering truck according to claim 1, wherein the at least one entrance is closable by means of a roller shutter.

7. A method of loading a movable aircraft catering truck as defined in claim 1, comprising the steps of:
    i. providing the movable aircraft catering truck of claim 1
    ii. lowering the floating deck such that it generally abuts the floor;

iii. loading cargo items onto the floating deck via the at least one entrance;
iv. raising the floating deck and roof to provide a working space between the floating deck and the floor;
v. loading cargo items onto the floor via the at least one entrance;
vi. lowering the floating deck and roof.

8. A method of loading and/or unloading cargo from a moveable aircraft catering truck into an aircraft, the method comprising steps of:
i. providing the movable aircraft catering truck of claim 1;
ii. raising the roof and floating deck relative to the floor so as to provide a working space between the floor and the floating deck;
iii. elevating the lift so as to bring the floor generally into alignment with a cargo hatch provided in the fuselage of an aircraft;
iv. loading and/or unloading cargo items between the cargo container and the aircraft from the floor of the cargo container via the at least one entrance;
v. lowering the floating deck relative to the floor so as to provide a working space between the floating deck and the roof;
vi. lowering the lift so as to bring the floating deck generally into alignment with the cargo hatch provided in the fuselage of the aircraft; and
vii. loading and/or unloading cargo items between the cargo container and the aircraft from the floating deck of the cargo container via the at least one entrance.

9. A movable aircraft catering truck comprising a cargo container, the cargo container comprising:
a generally horizontal floor capable of supporting catering trolleys and providing a first catering trolley storage area,
a generally horizontal movable roof,
a generally horizontal floating deck capable of supporting the catering trolleys and providing a second catering trolley storage area,
first and second side walls, end walls and at least one entrance for allowing loading and unloading of the catering trolleys, wherein
the at least one entrance is provided on one of the end walls,
the roof is vertically movable relative to the floor so as to vary the height of the cargo container,
the floating deck is independently vertically movable relative to the floor, thereby defining a first catering trolley storage area between the floor and floating deck for carrying the catering trolleys and defining a second catering trolley storage area between the floating deck and the roof for carrying the catering trolleys,
the first catering trolley storage area and the second catering trolley storage area each comprising a height that is sufficient for providing clearance for the catering trolleys,
the first catering trolley storage area and the second catering trolley storage area connected by an interconnecting hatch,
the floor provided with the two first side walls forming a generally U-shaped cross-section,
the roof provided with the two second side walls forming a generally inverted U-shaped cross-section,
the floor and the first side walls slidably engaging within the roof and the second side walls,
the roof and the second side walls forming a canopy over the floor, the first side walls and the first and the second catering trolley storage areas when housing the catering trolleys,
the cargo container is mounted on a body of the truck via an interposing lift, allowing the cargo container to be raised and lowered,
a gantry having a loading platform and adapted to engage with a cargo door of an aircraft, and
the gantry is vertically moveable such that the loading platform is capable of forming a continuous, substantially level surface together with either the floor or the floating deck.

* * * * *

UNITED STATES PATENT AND TRADEMARK OFFICE
CERTIFICATE OF CORRECTION

PATENT NO. : 10,081,442 B2
APPLICATION NO. : 14/901612
DATED : September 25, 2018
INVENTOR(S) : Martin Bryce et al.

Page 1 of 1

It is certified that error appears in the above-identified patent and that said Letters Patent is hereby corrected as shown below:

In the Claims

Claim 2, Column 8, Line 44, please delete "sidewalls of the floor is provided with two first".

Signed and Sealed this
Thirtieth Day of October, 2018

Andrei Iancu
*Director of the United States Patent and Trademark Office*